(12) United States Patent
Storm

(10) Patent No.: US 9,113,248 B2
(45) Date of Patent: Aug. 18, 2015

(54) DIAPHRAGM ARRANGEMENT FOR GENERATING SOUND

(75) Inventor: Stefan Storm, Unterschleißheim (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/348,012

(22) PCT Filed: Sep. 14, 2012

(86) PCT No.: PCT/DE2012/100280
§ 371 (c)(1), (2), (4) Date: Mar. 27, 2014

(87) PCT Pub. No.: WO2013/044909
PCT Pub. Date: Apr. 4, 2013

(65) Prior Publication Data
US 2014/0233769 A1    Aug. 21, 2014

(30) Foreign Application Priority Data
Sep. 28, 2011 (DE) .......................... 10 2011 114 471

(51) Int. Cl.
*H04R 7/04* (2006.01)
*F02C 7/04* (2006.01)
*H04R 7/10* (2006.01)
*B64C 21/00* (2006.01)
(Continued)

(52) U.S. Cl.
CPC *H04R 7/04* (2013.01); *B64C 21/00* (2013.01); *F02C 7/045* (2013.01); *H04R 7/10* (2013.01); *F05B 2260/962* (2013.01); *H04R 1/06* (2013.01); *H04R 17/00* (2013.01); *H04R 2201/02* (2013.01); *H04R 2307/027* (2013.01)

(58) Field of Classification Search
CPC ............ H04R 7/04; F02C 7/045; B64C 21/00
USPC .................... 381/190, 355, 67, 173, 423, 162; 244/204; 415/119
See application file for complete search history.

(56) References Cited

U.S. PATENT DOCUMENTS 3,947,644 A    3/1976  Uchikawa
4,593,160 A *  6/1986  Nakamura ..................... 381/163
(Continued)

FOREIGN PATENT DOCUMENTS

DE    22 40 923 C3    3/1973
DE    10042185 A1    1/2002
(Continued)

OTHER PUBLICATIONS

Office Action issued on May 3, 2012, in German Application No. 10 2011 114 471.8, filed Sep. 28, 2011.
(Continued)

*Primary Examiner* — Brian Miller
(74) *Attorney, Agent, or Firm* — Lowe Hauptman & Ham, LLP

(57) ABSTRACT

A diaphragm arrangement is disclosed to be fitted to a structural component or fixing ring for the purpose of generating sound. The diaphragm arrangement includes two piezo crystals fitted opposite one another on either side of an electrically conductive diaphragm, which can oscillate, and the piezo crystals are each fastened to the diaphragm. The piezo crystals are each electrically conductively connected to a contact plate on their opposing sides.

15 Claims, 3 Drawing Sheets

(51) Int. Cl.
*F02C 7/045* (2006.01)
*H04R 1/06* (2006.01)
*H04R 17/00* (2006.01)

(56) References Cited

U.S. PATENT DOCUMENTS

| | | | |
|---|---|---|---|
| 5,053,671 A * | 10/1991 | Kobayashi et al. | 310/329 |
| 5,648,697 A * | 7/1997 | Pirrung et al. | 310/338 |
| 6,472,797 B1 * | 10/2002 | Kishimoto | 310/324 |
| 6,472,798 B2 * | 10/2002 | Kishimoto | 310/344 |
| 6,541,894 B1 * | 4/2003 | Hanisch et al. | 310/317 |
| 6,741,710 B1 | 5/2004 | Takeshima et al. | |
| 6,888,947 B2 * | 5/2005 | Takeshima et al. | 381/190 |
| 6,969,942 B2 * | 11/2005 | Takeshima et al. | 310/324 |
| 7,141,919 B1 * | 11/2006 | Hamada et al. | 310/348 |
| 7,259,502 B2 * | 8/2007 | Kami et al. | 310/353 |
| 7,907,742 B2 * | 3/2011 | Nakajima et al. | 381/152 |
| 8,227,958 B2 * | 7/2012 | Inoue et al. | 310/344 |
| 8,280,080 B2 * | 10/2012 | Philliber et al. | 381/190 |
| 8,311,264 B2 * | 11/2012 | Lee | 381/423 |
| 8,406,438 B2 * | 3/2013 | Ihl et al. | 381/190 |
| 8,669,690 B2 * | 3/2014 | Ishii et al. | 310/334 |
| 2003/0213660 A1 | 11/2003 | Bhattacharya et al. | |
| 2012/0269366 A1 * | 10/2012 | Akino | 381/173 |

FOREIGN PATENT DOCUMENTS

| | | |
|---|---|---|
| DE | 19935768 C2 | 10/2003 |
| WO | 02/091492 A2 | 11/2002 |

OTHER PUBLICATIONS

International Search Report mailed Mar. 5, 2013 in International Application No. PCT/DE2012/100280, filed Sep. 14, 2012.
Written Opinion mailed Mar. 5, 2013 in International Application No. PCT/DE2012/100280, filed Sep. 14, 2012.

* cited by examiner

DIAPHRAGM ARRANGEMENT FOR GENERATING SOUND

RELATED APPLICATIONS

The present application is a National Phase of International Application Number PCT/DE2012/100280, filed Sep. 14, 2012, and claims priority from German Application Number 102011114471.8, filed Sep. 28, 2011.

FIELD OF THE INVENTION

The invention relates to a diaphragm arrangement having piezo crystals for being fitted to a structural component for the purpose of generating sound, having two piezo crystals which are fitted opposite one another on either side of an electrically conductive diaphragm which can vibrate.

BACKGROUND OF THE INVENTION

It has long been known to use diaphragm arrangements having piezo crystals for generating sound, for example as treble loudspeakers. It is also known to arrange diaphragm arrangements of this kind in components of aircraft or gas turbines around which air flows, in order to generate an opposing sound which has an opposite phase to the sound which is produced by operation, for the purpose of sound reduction. It is further known to use diaphragm arrangements of this kind in apparatuses for influencing the boundary layer in wings.

One disadvantage is that conventional diaphragm arrangements are susceptible to faults because the electrical connection cables of the piezo crystals to the diaphragm or to the piezo crystals themselves are such that they can be interrupted in the event of long-term operation.

Proceeding from this, the invention is based on the object of providing a diaphragm arrangement of this generic type, in which interruption of the electrical connection to the piezo crystals is reliably avoided.

SUMMARY OF THE INVENTION

According to the invention, this object is achieved by the features specified in Claim 1. In particular, the object is achieved in that the piezo crystals are each fastened to the diaphragm, which has a connection contact, in an electrically conductive and force-transmitting manner, and the piezo crystals are each electrically conductively connected to a contact plate on their opposite side, wherein each contact plate has at least one contact strip which extends substantially in the direction of the structural component and of which the free end has an electrical connection contact, wherein the diaphragm arrangement can be excited by electrical voltages which can be applied to the three connection contacts.

According to the invention, the connection cables are not also moved, but rather cables are connected at points which are not also moved when the diaphragm oscillates. This prevents the electrical contact-connection being interrupted during operation. Furthermore, the contact plates act as heat-conducting plates for dissipating heat from the piezo crystals.

According to an advantageous development of the invention, the diaphragm arrangement is round or oval, this being particularly simple in respect of structure and subjecting the material to uniform loading in the event of oscillation.

According to an advantageous development of the invention, a fixing ring can be fitted to the structural component, the diaphragm arrangement being fastened to said fixing ring. Therefore, the diaphragm arrangement forms an integral unit which can be fastened to the structural component.

According to an advantageous development of the invention, the contact strips are fitted to the fixing ring, and the connection contacts are connected to outer connections, which are situated next to one another on the fixing ring, in an electrically conductive manner. In this case, the fixing ring is preferably in the form of a printed circuit with lines which are electrically connected to the connection contacts of the two contact plates and also of the diaphragm and, by way of their respective other ends, lead to outer connections which are situated close to one another, so that electrical contact can be made with the diaphragm arrangement from one point.

According to an advantageous development of the invention, a metal wire mesh for the purpose of electrical connection is in each case arranged between the diaphragm and the two piezo crystals, adhesive passing through said metal wire mesh in order to fix the piezo crystals to the diaphragm. A wire mesh of this kind, which is preferably composed of a copper alloy, advantageously establishes electrical surface-contact with the piezo crystals at several points and therefore ensures reliable electrical connection, and therefore a long service life, even in the case of cracked electrode surfaces.

According to an advantageous development of the invention, a metal wire mesh for the purpose of electrical connection is in each case arranged between the two piezo crystals and the contact plates, adhesive passing through said metal wire mesh in order to fix the contact plates to the piezo crystals. A wire mesh of this kind, which is preferably composed of a copper alloy, advantageously establishes electrical surface-contact with the piezo crystals at several points and therefore ensures reliable electrical connection, and therefore a long service life, even in the case of cracked electrode surfaces.

According to an advantageous development of the invention, the piezo crystals are fastened to the diaphragm in a mechanically prestressed manner in such a way that no tensile stresses occur in said diaphragm during operation. This prevents damage to the piezo crystals due to tensile forces.

According to an advantageous development of the invention, the contact strip extends, starting from the contact plate, initially in the direction of the contact connection and, further away, further extends at a short distance from the diaphragm plane. The contact strip is preferably embedded in fiber-reinforced plastic, in particular glass fiber-reinforced plastic, as a result of which the electric field in this region can be reduced and therefore protection against electrical breakdown can be provided.

According to an advantageous development of the invention, the contact plates project beyond the edge of the piezo crystals and sealing rings are in each case arranged beneath the contact plates outside the narrow sides of the piezo crystals. This provides effective protection of the moisture-sensitive piezo elements against moisture. Increasing the size of the surface also results in better emission of heat from the piezo crystals.

According to an advantageous development of the invention, the diaphragm arrangement is enclosed by a non-conductive fiber-reinforced composite, which is preferably composed of glass fiber-reinforced plastic. This ensures a moisture-proof and electrically and mechanically protected structure of the diaphragm arrangement.

According to one advantageous development of this design, the fiber-reinforced composite extends beyond the diaphragm in the plane of said diaphragm and can be fixed to the outside of the structural component, wherein at least one contact strip, which extends in the direction of the structural component, is provided on the diaphragm, the end of said contact strip having a connection contact. Large vibration amplitudes of the diaphragm result in a transverse contraction which would introduce strong forces into the clamping arrangement owing to the high mechanical step-down ratio. The development provides soft suspension of the diaphragm, which has an insulating effect, and therefore the generated oscillations are transmitted to the structural component only to a reduced extent.

According to an advantageous development of the invention, the diaphragm has two radially opposite contact strips. This provides symmetrical suspension of the diaphragm and therefore optimized generation of oscillation.

A further embodiment of the invention makes provision for a gas turbine engine to be provided with at least a number of stator blades, wherein the above-described diaphragm arrangement is fitted at least to some of the stator blades. This results in an effective reduction in sound, in particular when the diaphragm arrangements are fitted to the stator blades of a bypass channel or a fan stage.

A further embodiment of the invention makes provision for a wing having a slot actuator system for influencing the boundary layer to be characterized in that said wing comprises an above-described diaphragm arrangement. Systems of this kind have been recently proposed, said systems being arranged, for example, on the leading edges of tail units in order to influence the boundary layer for the purpose of extending the region of laminar flow.

BRIEF DESCRIPTION OF THE DRAWINGS

Further features, possible applications and advantages of the invention can be found in the following description of figures with reference to exemplary embodiments. In the drawings.

DETAILED DESCRIPTION OF SOME EMBODIMENTS

Figure 1:
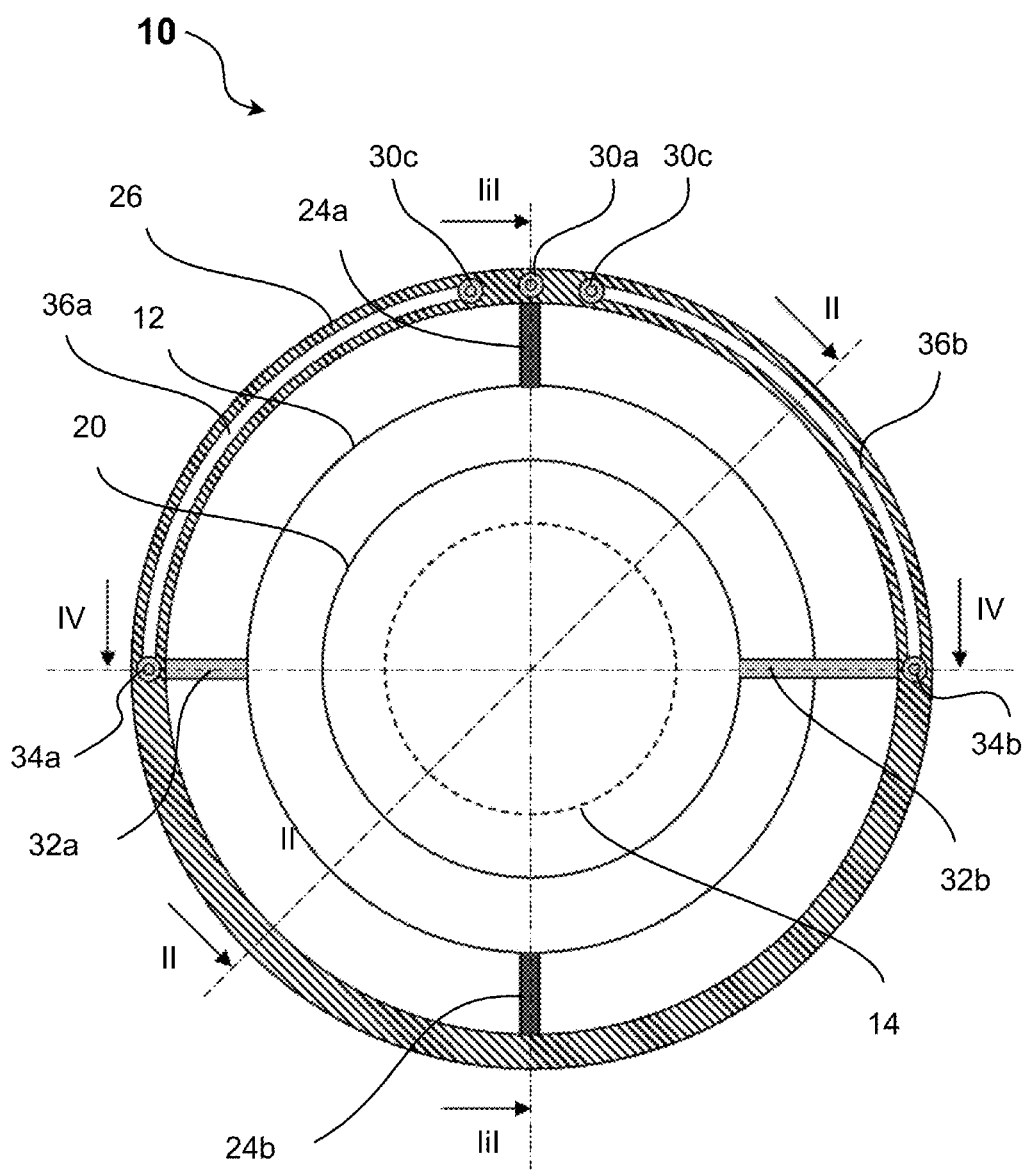
FIG. 1: shows a plan view of a diaphragm arrangement according to an exemplary embodiment of the invention.
Figure 2:
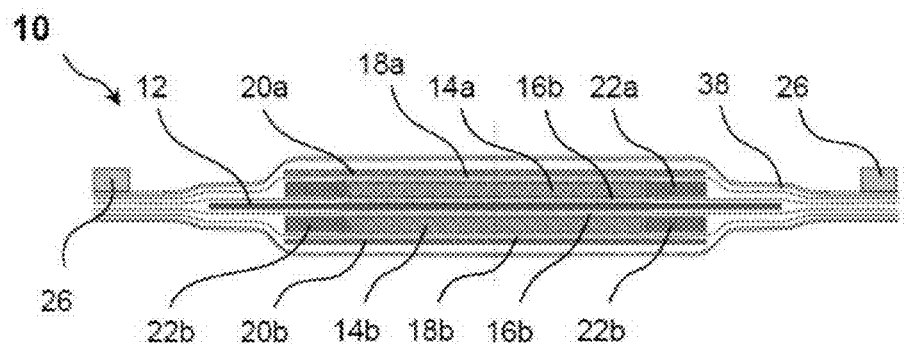
FIG. 2: shows a sectional illustration along line II-II from FIG. 1.
Figure 3:
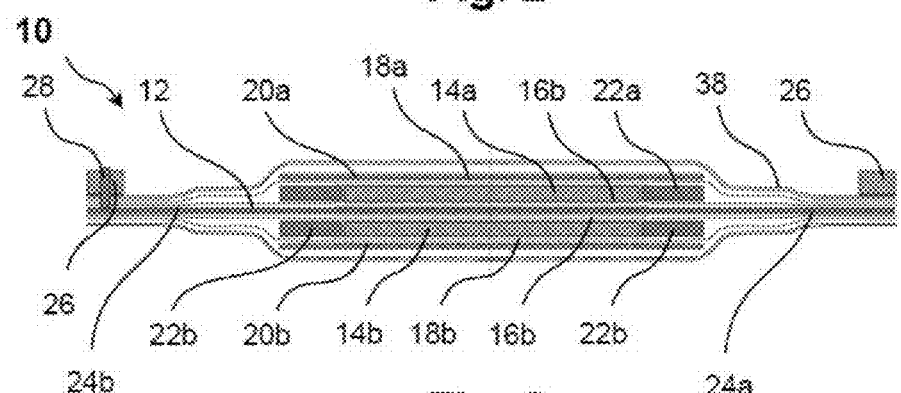
FIG. 3: shows a sectional illustration along line III-III from FIG. 1.

FIGS. 1 to 4 show an embodiment of a diaphragm arrangement 10 in plan view and also three sections which are denoted II-II, III-III and IV-IV. The diaphragm arrangement 10 substantially comprises a circular disk-like metal diaphragm 12 on either side of which two piezo crystals 14a, 14b are firmly fitted opposite one another in each case by means of a copper mesh 16a, 16b through which adhesive passes. In this case, an electrical connection is formed between the copper mesh 16a, 16b and the respective piezo crystal 14a, 14b or the diaphragm 12 at several points by means of the copper mesh 16a, 16b. In this case, the space between the copper meshes 16a, 16b is completely filled with adhesive, preferably with an epoxy-based synthetic resin.

The sides of the two piezo crystals 14a, 14b which are each situated opposite the diaphragm 12 are connected to electrically conductive, preferably metal, contact plates 20a, 20b by means of further copper meshes 18a, 18b in the same way. The contact plates 20a, 20b project radially beyond the piezo crystals 14a, 14b. Sealing rings 22a, 22b are provided radially outside the piezo crystals 14a, 14b, said sealing rings being arranged in a sealing manner between the diaphragm 12 and the contact plates 20a, 20b and protecting the moisture-sensitive narrow sides of the piezo crystals 14a, 14b against moisture. Said sealing rings are preferably composed of brass or copper beryllium.

As shown along section line in FIG. 1, the diaphragm 12 comprises two opposite contact strips 24a, 24b which are fastened to a fixing ring 26. The diaphragm 12 is electrically conductively connected to a connection contact 30a (FIG. 1) which is fitted on the fixing ring 26 by a contact strip 24a by means of a contact pin 28 using silver conductive adhesive.

Figure 4:
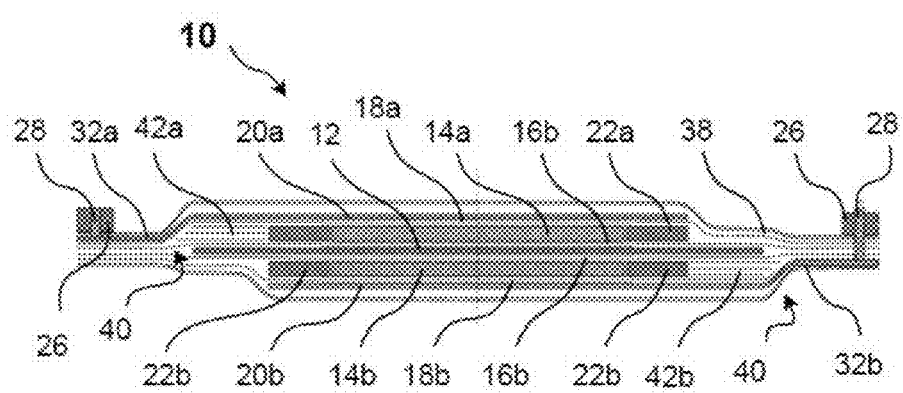
FIG. 4: shows a sectional illustration along line IV-IV from FIG. 1.

As shown in FIG. 4 or section line IV-IV in FIG. 1, the two contact plates 20a, 20b each comprise contact strips 32a, 32b which are likewise connected to contacts 34a, 34b by means of contact pins 28. Said contacts are electrically conductively connected to connection contacts 30b, 30c via conductor tracks 36a, 36b which are fitted on the fixing ring 26. In this way, the three required contact connections 30a, 30b, 30b for introducing a voltage U1 between the connection contacts 30b, 30a to the piezo crystal 14a, and a voltage U2 between the connection contacts 30a, 30c to the piezo crystal 14b are close to one another. In order to excite the diaphragm arrangement 10 according to the invention, a voltage of 0 V is preferably applied to the connection contact 30b, a DC voltage in the range of from 200-400 V is preferably applied to the connection contact 30c, and an AC voltage which lies between 0 V and the voltage across the connection contact 30c is preferably applied to the connection contact 30a of the diaphragm 12.

The diaphragm arrangement 10 comprises an outer layer 38 which is composed of a glass-fiber reinforced plastic. As shown in FIG. 4, the two contact strips 32a, 32b which are connected to the contact plates 20a, 20b initially extend in the plane of the contact plates 20a, 20b, in order to then, further radially on the outside, bend inward at the bending points which are denoted 40 and to run closer to the diaphragm 12, so that thickened portions 42a, 42b are formed below the contact strips 32a, 32b, said thickened portions reducing the electric field and therefore providing protection against electrical breakdowns.

In a preferred embodiment, the fixing ring 26 has an outside diameter of 100 mm and a width of 5 mm. The diaphragm 12 has a diameter of 70 mm and a thickness of 0.10 mm. The piezo crystals 14a, 14b have a diameter of 40 mm and a thickness of 0.30 mm. The thickness of the copper meshes 16 and 18 is 0.1 mm. The total thickness of the diaphragm arrangement 10 is approximately 1.7 mm.

Figure 5:
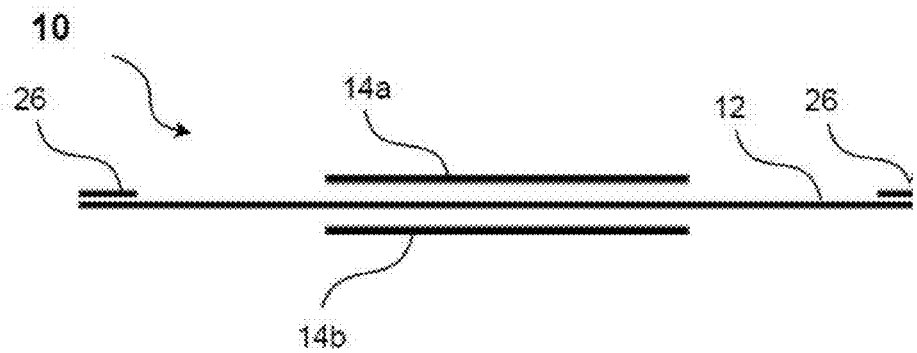
FIG. 5: shows a schematic longitudinal sectional illustration of a first embodiment.
Figure 6:
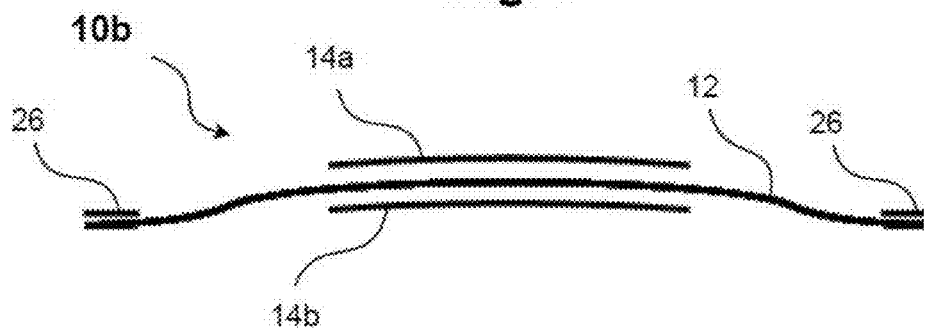
FIG. 6: shows a schematic longitudinal sectional illustration of a second embodiment.
Figure 7:
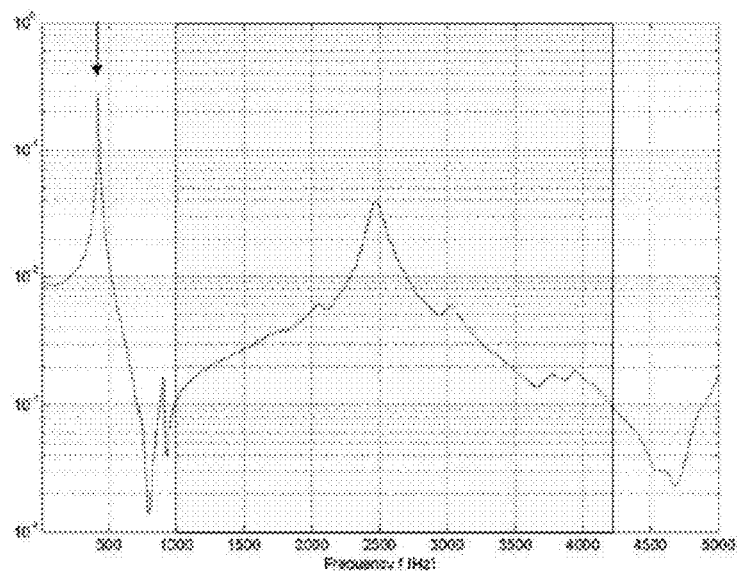
FIG. 7: shows a graph which illustrates the oscillation behavior with respect to the excitation frequency.

FIGS. 5 and 6 show, in a highly schematic manner, two embodiments of diaphragm arrangements 10 and 10b. The diaphragm arrangement 10 which is shown in FIG. 5 corresponds to the embodiment which is illustrated in FIGS. 1 to 4, with a planar diaphragm 12 and correspondingly planar piezo crystals 14a and 14b. In the embodiment 10b, the diaphragm 12 is curved in the manner of a sphere and the piezo crystals 14a and 14b are correspondingly shaped. The curvature is preferably produced in such a way that the center of the diaphragm 12 is situated approximately 0.5 to 2 mm above the plane of a planar diaphragm. This embodiment is suitable for compensating for static pressure loads of up to approximately 2 bar.

FIG. 6 shows a graph which represents the maximum deflection of an embodiment of a diaphragm 12 in the dimension [mm] in its center in relation to the excitation frequency in the dimension [Hz]. Said graph shows that the range around the second parallel modes in the region around 2500 Hz is preferably used in order to be able to operate the diaphragm arrangement 10 at a low voltage in order to achieve a desired sound level. The frequency range used is between approximately 1000 and 4200 Hz. The low first parallel oscillation mode allows soft suspension of the diaphragm, as a result of which good mechanical decoupling from the clamping arrangement takes place both in the sound-emitting direction and in the transverse direction. This protects the component which accommodates the diaphragm against the vibrations of the diaphragm if said component has natural resonances in the region of the excitation. Conversely, the diaphragm, or the piezo ceramic, is protected against strong static forces—caused by temperature expansion or low-frequency movements.

LIST OF REFERENCE SYMBOLS

10 Diaphragm arrangement
12 Diaphragm
14a,b Piezo crystal
16a,b Copper mesh
18a,b Copper mesh
20a,b Contact plate
22a,b Sealing ring
24a,b Contact strip
26 Fixing ring
28 Contact pin
30a,b,c Connection contact
32a, b Contact strip
34a,b Contact
36a,b Conductor track
38 Glass-fiber reinforced layer
40 Bent portions
42a, b Thickened portions

The invention claimed is:

1. A diaphragm arrangement configured to be fitted to a structural component for the purpose of generating sound, the diaphragm arrangement comprising:
an electrically conductive diaphragm which can oscillate,
two piezo crystals which are fitted opposite one another on either side of the electrically conductive diaphragm,
wherein the piezo crystals are each fastened to the diaphragm,
wherein the piezo crystals are each electrically conductively connected to a separate contact plate on their side opposite said diaphragm, a pair of contact strips extending substantially in the direction of the structural component, wherein the first contact strip includes a free end and a second opposite end connected to one of the contact plates, and wherein the second contact strip includes a free end and a second opposite end connected to the other of the two contact plates, wherein each free end has an electrical connection contact point.

2. The diaphragm arrangement according to claim 1, wherein said diaphragm arrangement is round or oval.

3. The diaphragm arrangement according to claim 1, further comprising a fixing ring adapted to be fitted to the structural component, and wherein the contact strips are configured to be attached to said fixing ring.

4. The diaphragm arrangement according to claim 3, wherein the contact strips are fitted to the fixing ring, and the connection contacts are connected to outer connections, which are situated next to one another on the fixing ring, in an electrically conductive manner.

5. The diaphragm arrangement according to claim 1, wherein an electrically conductive filling material for the purpose of electrical connection is in each case arranged between the two piezo crystals and the diaphragm or the contact plates, adhesive passing through said filling material in order to fix the piezo crystals to said diaphragm in an electrically conductive manner.

6. The diaphragm arrangement according to claim 1, wherein the piezo crystals are fastened to the diaphragm in a mechanically prestressed manner in such a way that no tensile stresses occur in said diaphragm during operation.

7. The diaphragm arrangement according to claim 1, wherein each of the contact strips extends, starting from the respective contact plate, initially in the direction of the contact connection and then further extends at a short distance from a diaphragm plane.

8. The diaphragm arrangement according to claim 1, wherein the contact plates project radially beyond the edge of the piezo crystals.

9. The diaphragm arrangement according to claim 8, wherein sealing rings are in each case arranged beneath the contact plates outside the narrow sides of the piezo crystals.

10. The diaphragm arrangement according to claim 1, further comprising a non-conductive fiber-reinforced composite.

11. The diaphragm arrangement according to claim 10, wherein the fiber-reinforced composite extends beyond the diaphragm in the plane of said diaphragm and can be fixed to the outside of the fixing ring, wherein at least one contact strip, which extends in the direction of the fixing ring, is provided on the diaphragm, the end of said contact strip having a connection contact.

12. The diaphragm arrangement according to claim 1, wherein the diaphragm has two radially opposite contact strips.

13. A gas turbine, comprising: an engine having a plurality of stator blades, wherein the diaphragm arrangement of claim 1 is fitted to at least one of said plurality of stator blades.

14. A wing, comprising: a slot actuator system for influencing the boundary layer, wherein said wing further includes the diaphragm arrangement of to claim 1.

15. A diaphragm arrangement configured to be fitted to a structural component for the purpose of generating sound, the diaphragm arrangement comprising:
an electrically conductive diaphragm which can oscillate,
two piezo crystals which are fitted opposite one another on either side of the electrically conductive diaphragm,
wherein the piezo crystals are each fastened to the diaphragm,
wherein the piezo crystals are each electrically conductively connected to a separate contact plate on their opposite side, wherein each contact plate has at least one contact strip which extends substantially in the direction of the structural component,
wherein the free end has an electrical connection contact point,
wherein an electrically conductive filling material for the purpose of electrical connection is in each case arranged between the two piezo crystals and the diaphragm or the contact plates, adhesive passing through said filling material in order to fix the piezo crystals to said diaphragm in an electrically conductive manner, and wherein the filling material is a metal wire mesh composed of a copper alloy.

* * * * *